United States Patent
Hirano et al.

(10) Patent No.: US 11,108,923 B2
(45) Date of Patent: Aug. 31, 2021

(54) INFORMATION PROCESSING APPARATUS FOR ENABLING USER ACCESS PERSONAL SETTING OF ANOTHER

(71) Applicant: FUJIFILM Business Innovation Corp., Tokyo (JP)

(72) Inventors: Tomoaki Hirano, Kanagawa (JP); Tomonori Tanaka, Kanagawa (JP); Tatsuo Mishima, Kanagawa (JP); Rie Muraishi, Kanagawa (JP); Manabu Hayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/734,396

(22) Filed: Jan. 5, 2020

(65) Prior Publication Data

US 2021/0075922 A1    Mar. 11, 2021

(30) Foreign Application Priority Data

Sep. 5, 2019    (JP) .............................. JP2019-162201

(51) Int. Cl.
*H04N 1/00*    (2006.01)
*G06F 21/60*    (2013.01)
*G06F 21/40*    (2013.01)

(52) U.S. Cl.
CPC ......... *H04N 1/00347* (2013.01); *G06F 21/40* (2013.01); *G06F 21/608* (2013.01); *H04N 1/0048* (2013.01); *H04N 2201/001* (2013.01)

(58) Field of Classification Search
CPC ............. H04N 1/00347; H04N 1/0048; H04N 2201/001; G06F 21/608; G06F 21/40
See application file for complete search history.

(56) References Cited

U.S. PATENT DOCUMENTS

| | | | | |
|---|---|---|---|---|
| 2013/0182279 A1* | 7/2013 | Yano | ..................... | G06F 21/608 358/1.14 |
| 2013/0247156 A1* | 9/2013 | Savo | ....................... | G06F 21/40 726/4 |
| 2014/0372514 A1* | 12/2014 | Doui | ..................... | G06F 21/608 709/203 |
| 2015/0149923 A1* | 5/2015 | Shogaki | ............... | G06F 21/608 715/747 |
| 2015/0249645 A1* | 9/2015 | Sobel | .................... | H04L 63/101 726/12 |
| 2018/0288026 A1* | 10/2018 | Callaghan | ............... | G06F 21/31 |

FOREIGN PATENT DOCUMENTS

| | | |
|---|---|---|
| JP | 4980190 | 7/2012 |
| JP | 6060537 | 1/2017 |

\* cited by examiner

*Primary Examiner* — Juan M Guillermety
(74) *Attorney, Agent, or Firm* — JCIPRNET

(57) ABSTRACT

An information processing apparatus includes a processor configured to obtain, from a certain user identified from input authentication information for authenticating the certain user, a request to share personal setting information regarding a personal setting of another user and permit the certain user to share the other user's personal setting information in accordance with permission information indicating the other user's permission.

12 Claims, 9 Drawing Sheets

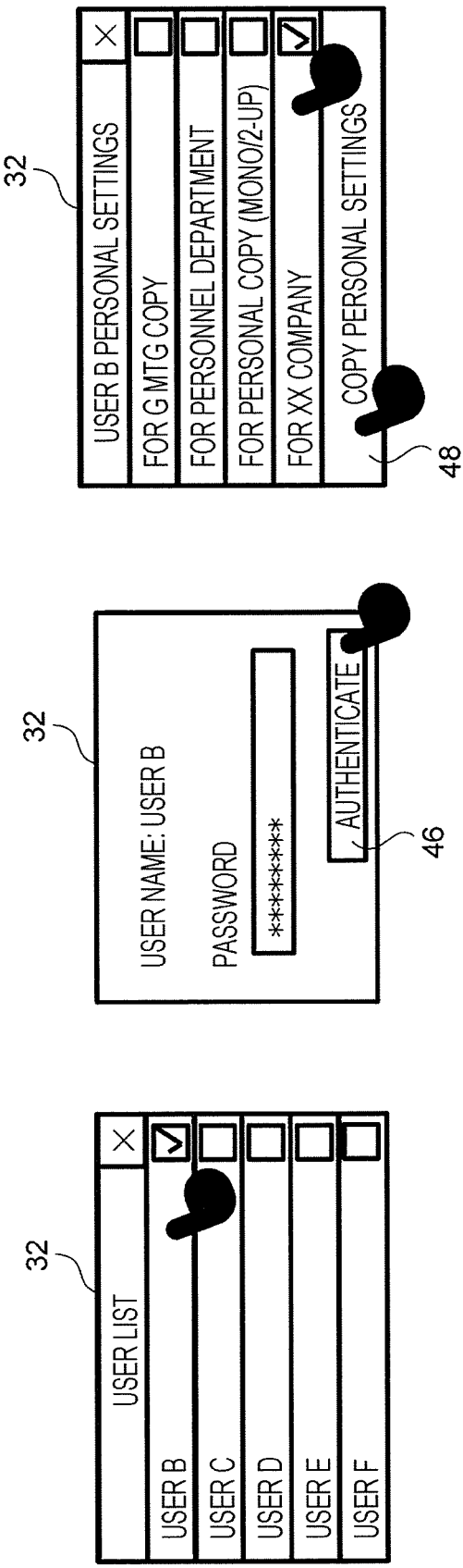

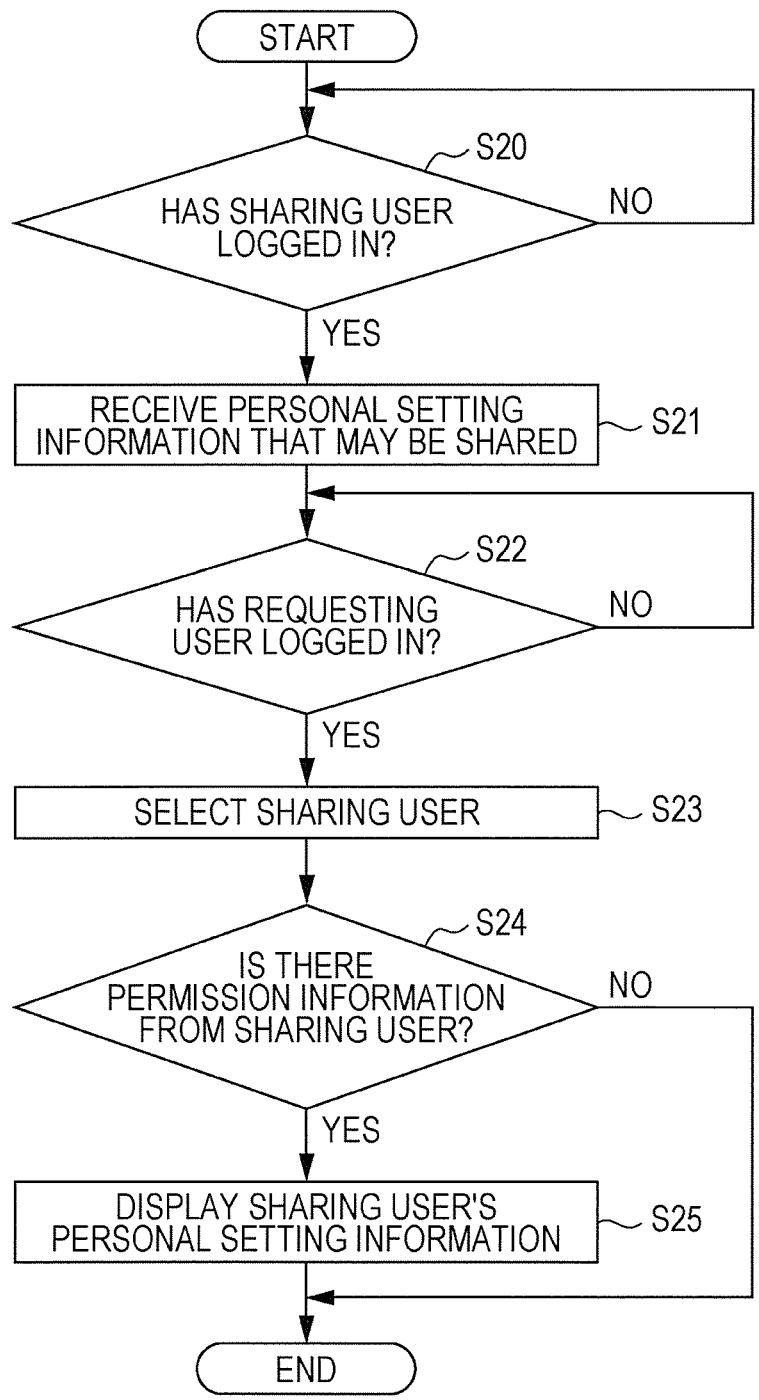

FIG. 7A

USER LIST
- USER A ✓
- USER C
- USER D
- USER E
- USER F

USER B PERSONAL SETTINGS
- FOR G MTG COPY
- FOR PERSONNEL DEPARTMENT ✓
- FOR PERSONAL COPY (MONO/2-UP)
- FOR XX COMPANY ✓
- PERMIT COPYING 32, 52

FIG. 9A

USER LIST
USER B
USER C
USER D
USER E
USER F

FIG. 9B

USER B PERSONAL SETTINGS
FOR G MTG COPY
FOR XX COMPANY
COPY PERSONAL SETTINGS

INFORMATION PROCESSING APPARATUS FOR ENABLING USER ACCESS PERSONAL SETTING OF ANOTHER

CROSS-REFERENCE TO RELATED APPLICATIONS

This application is based on and claims priority under 35 U.S.C. 119 from Japanese Patent Application No. 2019-162201 filed Sep. 5, 2019.

BACKGROUND

(i) Technical Field

The present disclosure relates to an information processing apparatus and a non-transitory computer readable medium.

(ii) Related Art

In Japanese Patent No. 4980190, an image forming apparatus, an image management system, and a program capable of efficiently removing unnecessary customized information regarding users are described.

SUMMARY

Aspects of non-limiting embodiments of the present disclosure relate to enabling a certain user identified from input authentication information to use another user's personal setting information if the other user's permission exists.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to obtain, from a certain user identified from input authentication information for authenticating the certain user, a request to share personal setting information regarding a personal setting of an other user and permit the certain user to share the personal setting information of the other user in accordance with permission information indicating the other user's permission.

BRIEF DESCRIPTION OF THE DRAWINGS

An exemplary embodiment of the present disclosure will be described in detail based on the following figures, wherein:

FIGS. 3A to 3C illustrate an example of screens displayed on a display unit during the process illustrated in the flowchart of FIG. 2;

FIGS. 4A to 4C illustrate an example of screens displayed on the display unit during the process illustrated in the flowchart of FIG. 2;

FIG. 5 is a flowchart illustrating a process in which personal setting information is shared according to a second exemplary embodiment;

FIGS. 7A and 7B illustrate an example of screens displayed on the display unit during the process illustrated in the flowchart of FIG. 5;

FIGS. 9A and 9B illustrate an example of screens displayed on the display unit during the process illustrated in the flowchart of FIG. 5.

DETAILED DESCRIPTION

First Exemplary Embodiment

An image processing apparatus 10 as an information processing apparatus according to a first exemplary embodiment will be described hereinafter.

The image processing apparatus 10 is a multifunction peripheral (MFP) having functions of performing various types of image processing such as scanning, printing, copying, and facsimile. The image processing apparatus 10 is capable of registering personal setting information, which relates to personal settings of users in image processing. In the personal setting information, for example, color printing is set as a default for a case where copying is performed as image processing.

In the first exemplary embodiment, a user's personal setting information registered in the image processing apparatus 10 can be shared with another user. Details will be described later.

Next, the hardware configuration of the image processing apparatus 10 will be described.

Figure 1:
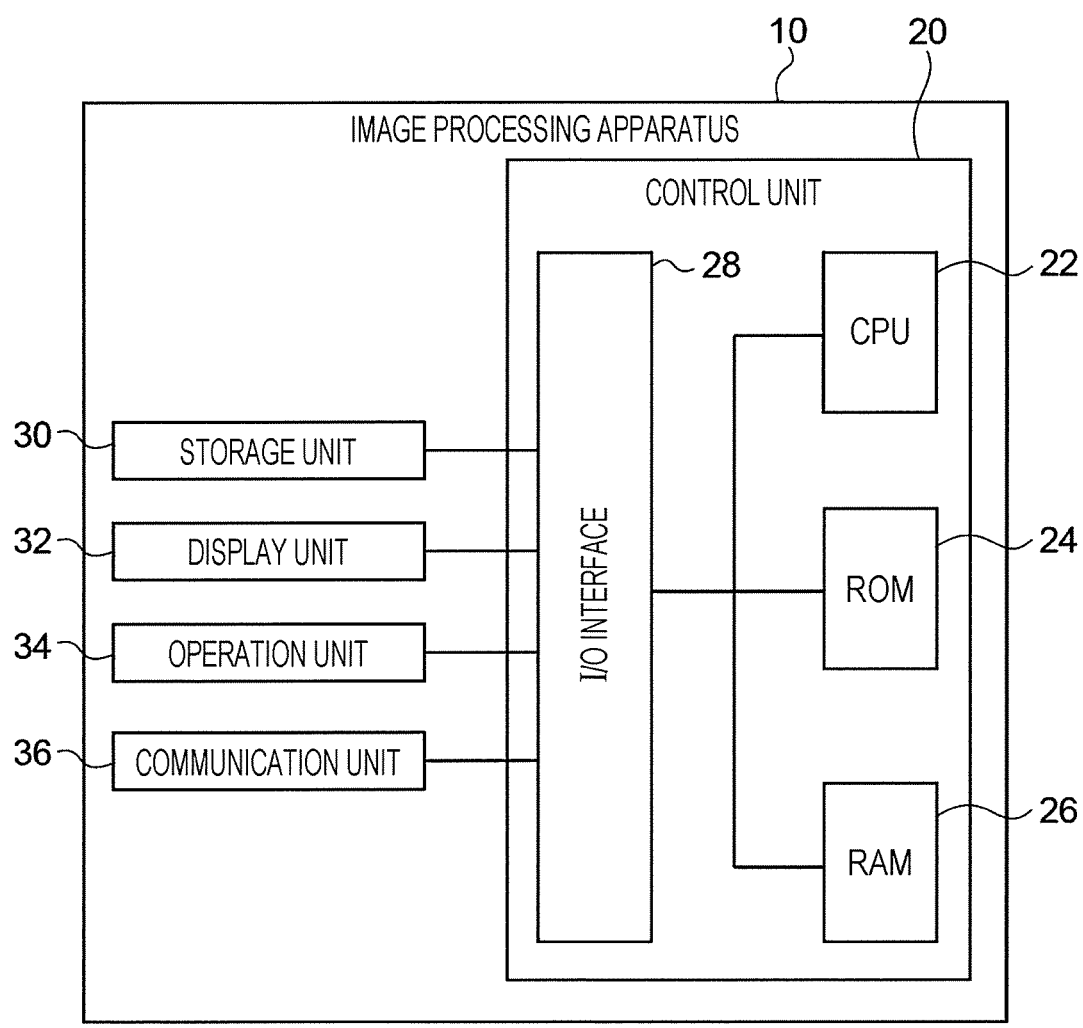
FIG. 1 is a block diagram illustrating the hardware configuration of an image processing apparatus according to exemplary embodiments.

FIG. 1 is a block diagram illustrating the hardware configuration of the image processing apparatus 10.

As illustrated in FIG. 1, the image processing apparatus 10 includes a control unit 20 that controls the operation of the image processing apparatus 10. In the control unit 20, a central processing unit (CPU) 22, a read-only memory (ROM) 24, a random-access memory (RAM) 26, and an input/output (I/O) interface 28 are communicably connected to one another by a bus.

The CPU 22 executes various programs and controls the other components. That is, the CPU 22 reads a program from the ROM 24 and executes the program using the RAM 26 as a working area. The CPU 22 controls the above components and performs various types of arithmetic processing in accordance with programs stored in the ROM 24.

The ROM 24 stores various programs and various pieces of data. The various programs include at least a program for processing an image, which is a program for processing information used to cause a computer to function as the CPU 22 of the image processing apparatus 10. The program for processing an image may be installed on the image processing apparatus 10 in advance. Alternatively, the program for processing an image may be stored in a nonvolatile storage medium or distributed through a network and then installed on the image processing apparatus 10 as necessary. The nonvolatile storage medium may be, for example, a compact disc read-only memory (CD-ROM), a magneto-optical (MO) disk, a hard disk drive (HDD), a digital versatile disc read-only memory (DVD-ROM), a flash memory, a memory card, or the like.

The RAM 26 temporarily stores a program or data as a working area.

A storage unit 30, a display unit 32, an operation unit 34, and a communication unit 36 are connected to the I/O interface 28.

As the storage unit 30, for example, an HDD, a solid-state drive (SSD), a flash memory, or the like is used.

As the display unit 32, for example, a liquid crystal display (LCD), an organic electroluminescent (EL) display, or the like is used. The display unit 32 includes a touch panel in an integrated manner.

The operation unit 34 is provided with operation keys for receiving various instructions from a user of the image processing apparatus 10.

The display unit 32 and the operation unit 34 receive various instructions from the user. The various instructions include, for example, an instruction to start scanning and an instruction to start copying. The display unit 32 displays various pieces of information such as a result of a process performed in accordance with an instruction received from the user and a notification relating to a process.

The communication unit 36 communicates with a terminal apparatus such as a personal computer, which is not illustrated, through a network. As the network, for example, the Internet, a local area network (LAN), a wide area network (WAN), or the like is used.

Next, a process for sharing personal setting information will be described with reference to FIGS. 2 to 4C. It is assumed in the following description that personal setting information to be shared is personal setting information for copying. A user who shares his/her own personal setting information with another user will be referred to as a "sharing user", and a user who requests sharing of a sharing user's personal setting information will be referred to as a "requesting user" hereinafter. The requesting user is an example of a certain user, and the sharing user is an example of another user.

Figure 2:
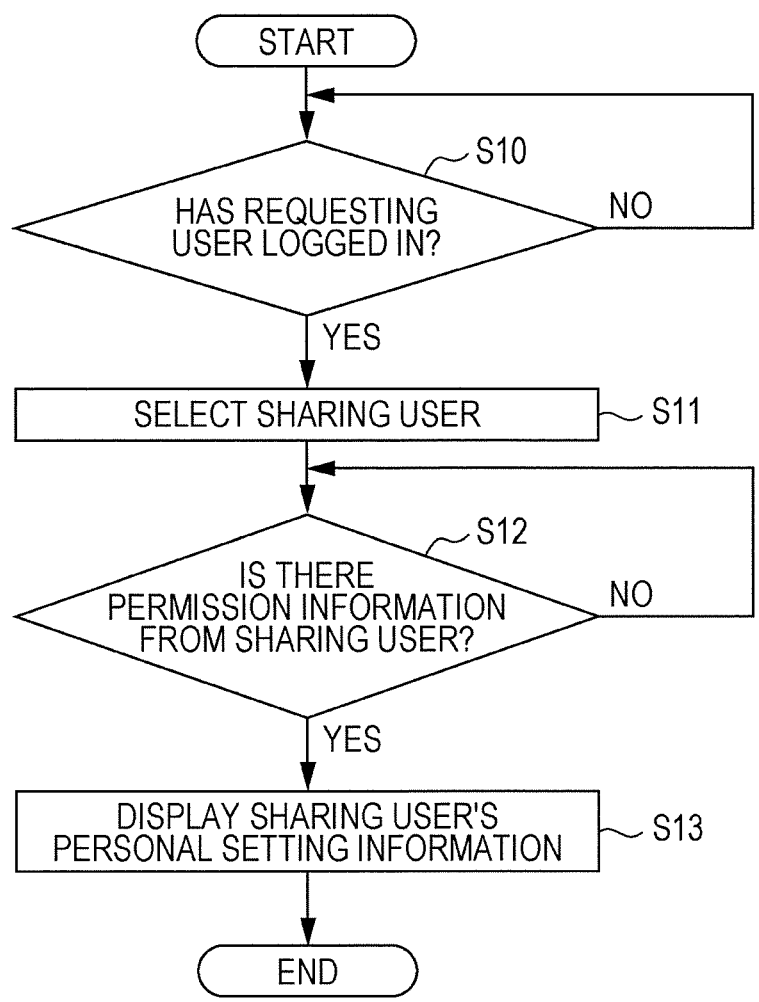
FIG. 2 is a flowchart illustrating a process in which personal setting information is shared according to a first exemplary embodiment.

In step S10 illustrated in FIG. 2, the CPU 22 determines whether a requesting user has logged in the image processing apparatus 10. If so, the process proceeds to step S11, and if not, step S10 is performed again. Here, the CPU 22 does not determine whether a user is a requesting user or a sharing user. The CPU 22 simply determines in step S10 whether a user has logged in the image processing apparatus 10. When the user who has logged in selects another user in step S11 in order to use the other user's personal setting information, the user who has logged in is determined as a requesting user, and the other user is determined as a sharing user. It is assumed in FIG. 2 that a user who has logged in will select another user in step S11, and the user who has logged in step S10 is called a "requesting user" from the beginning for the sake of convenience.

Figures 3A, 3B, 3C:
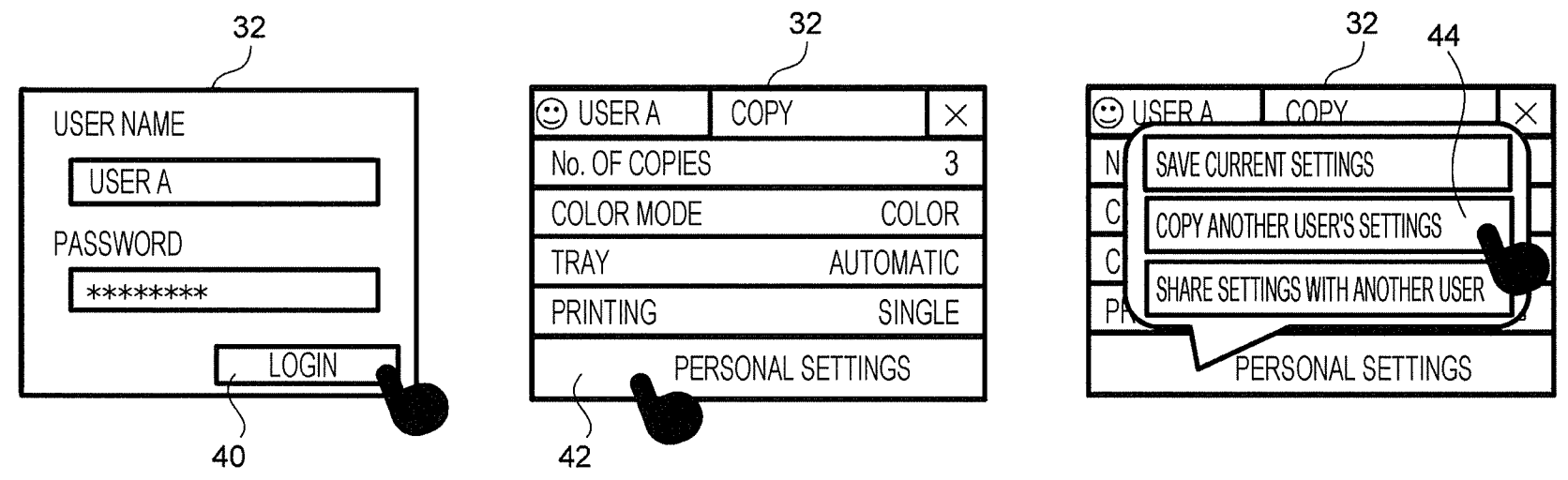

FIG. 3A illustrates an example of a login screen displayed on the display unit 32. In FIG. 3A, a requesting user operates the image processing apparatus 10. In this example, the requesting user is user A. User A inputs a user name and a password on the displayed login screen and uses a login button 40.

If a user name and a password of user A registered in advance and the input user name and password match, the CPU 22 determines that user A has logged in the image processing apparatus 10. Since user A has logged in the image processing apparatus 10 by inputting authentication information for authenticating users, user A has been identified as a unique user. That is, user A, who is a requesting user, is an example of the certain user. The authentication information here is the user name and the password used for password authentication.

In step S11 illustrated in FIG. 2, the CPU 22 receives selection of a sharing user whose personal setting information is to be copied. The process then proceeds to step S12.

FIGS. 3B and C illustrate an example of screens displayed on the display unit 32 after the requesting user logs in. In FIGS. 3B and 3C, user A, who is a requesting user, operates the image processing apparatus 10. User A uses a personal settings button 42 (refer to FIG. 3B) on the displayed screen and then uses a copy button 44 (refer to FIG. 3C) among a plurality of items corresponding to personal settings displayed on the screen.

If user A performs the above operation, the CPU 22 displays a user list screen illustrated in FIG. 4A on the display unit 32 and receives selection of a sharing user whose personal setting information is to be copied. The user list screen includes users whose personal setting information is registered in the image processing apparatus 10. It is assumed here that user A selects user B as a sharing user among the displayed users. User B, who is a sharing user, is an example of the other user. In other words, in step S11, the CPU 22 obtains, from user A, who is a requesting user, a request to share personal setting information of user B, who is a sharing user.

In step S12 illustrated in FIG. 2, the CPU 22 determines whether there is permission information from the sharing user. If so, the process proceeds to step S13, and if not, step S12 is performed again. Permission information is information indicating permission to share a sharing user's personal setting information with a requesting user.

FIG. 4B illustrates an example of an input screen displayed on the display unit 32, on which the sharing user inputs permission information. In FIG. 4B, user B, who is a sharing user, operates the image processing apparatus 10.

As illustrated in FIG. 4B, as on the login screen illustrated in FIG. 3A, user B can input a password on the input screen. Unlike on the login screen illustrated in FIG. 3A, on the other hand, user B does not input a user name on the input screen. A name of user B, who is a sharing user, is input as a user name in advance.

User B inputs a password on the displayed input screen and uses an authenticate button 46. That is, the CPU 22 receives authentication information for authenticating the sharing user as permission information. If a password of user B registered in advance and the input password match, the CPU 22 determines that the sharing user has permitted the sharing of the personal setting information. The authentication information here is the user name and the password used for password authentication. The CPU 22 thus obtains the request to share the personal setting information from user A, who is a requesting user, in step S11, and then receives the permission information from user B, who is a sharing user, in step S12.

In step S13 illustrated in FIG. 2, the CPU 22 displays the sharing user's personal setting information on the display unit 32. The process then ends.

FIG. 4C illustrates an example of personal settings of the sharing user. As illustrated in FIG. 4C, the display unit 32 displays the personal settings of user B, who is a sharing user. In FIG. 4C, user A, who is a requesting user, operates the image processing apparatus 10. User A selects "For XX Company" among a plurality of pieces of personal setting information on the displayed screen and uses a copy button 48. In this case, the CPU 22 copies "For XX Company", which is the selected piece of user B's personal setting information, to a personal setting page of user A. When the personal setting page of user A is displayed after the copying, therefore, the copied piece of user B's personal setting information, "For XX Company", is displayed, and user A can select the piece of user B's personal setting information as his/her own personal setting.

As described above, after permission information is input, the CPU 22 receives personal setting information that may be shared with a requesting user. If there are a plurality of pieces of personal setting information as personal settings of a sharing user, the CPU 22 permits sharing of a certain one of the pieces of personal setting information. In the first exemplary embodiment, a requesting user selects a certain one of pieces of a sharing user's personal setting information, and the CPU 22 then permits sharing of the certain piece of the sharing user's personal setting information.

Second Exemplary Embodiment

Next, a second exemplary embodiment will be described while omitting or simplifying elements that are the same as elements of other exemplary embodiments. The second exemplary embodiment is different from the first exemplary embodiment in that a sharing user can select a piece of personal setting information that may be shared with a requesting user before the requesting user requests sharing of the piece of personal setting information.

FIG. 5 is a flowchart illustrating a process in which personal setting information is shared according to the second exemplary embodiment.

In step S20 illustrated in FIG. 5, the CPU 22 determines whether a sharing user has logged in the image processing apparatus 10. If so, the process proceeds to step S21, and if not, step S20 is performed again. Here, the CPU 22 does not determine whether a user is a requesting user or a sharing user. The CPU 22 simply determines in step S20 whether a user has logged in the image processing apparatus 10. When the user who has logged in selects sharing of his/her own personal setting information in step S21, the user who has logged in is determined as a sharing user. It is assumed in FIG. 5 that a user who has logged in will select sharing of his/her personal setting information, and the user who has logged in step S20 is called a "sharing user" from the beginning for the sake of convenience.

Figure 6A:
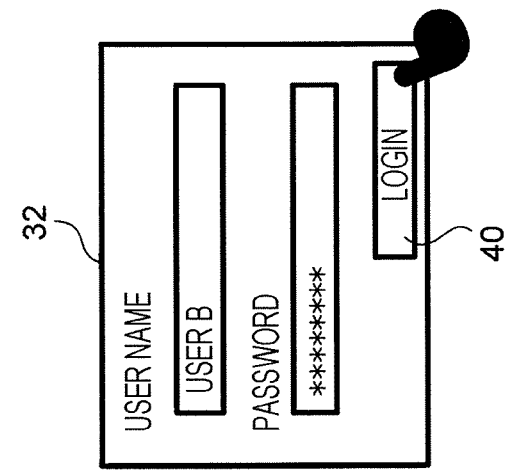
FIGS. 6A to 6C illustrate an example of screens displayed on a display unit during the process illustrated in the flowchart of FIG. 5.

FIG. 6A is an example of a login screen displayed on the display unit 32. In FIG. 6A, the sharing user operates the image processing apparatus 10. In this example, the sharing user is user B. User B inputs a user name and a password on the displayed login screen and uses the login button 40.

If a user name and a password of user B registered in advance and the input user name and password match, the CPU 22 determines that user B has logged in the image processing apparatus 10.

In step S21 illustrated in FIG. 5, the CPU 22 receives personal setting information to be shared by the sharing user. The process then proceeds to step S22.

Figure 6B:
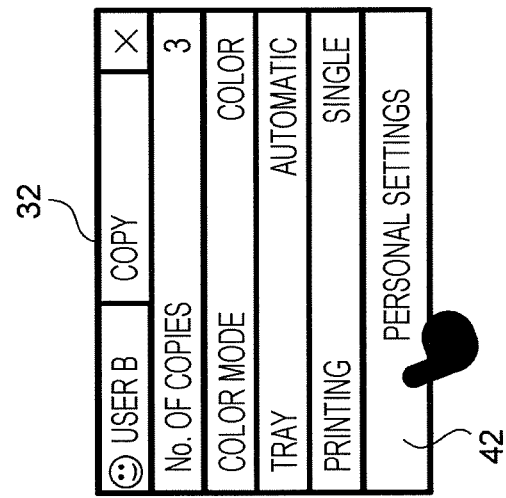
Figure 6C:
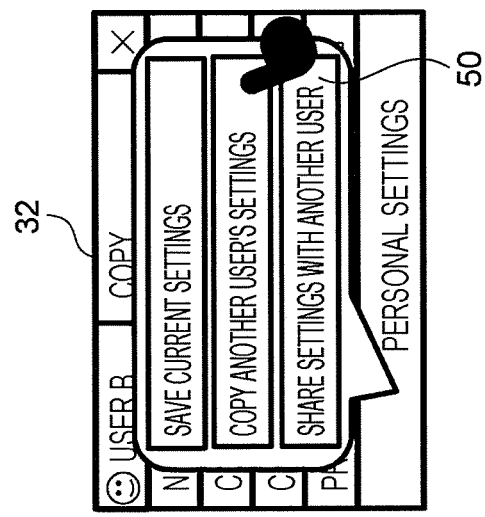

FIGS. 6B and 6C illustrate an example of screens displayed on the display unit 32 after the sharing user logs in. In FIGS. 6B and 6C, user B, who is a sharing user, operates the image processing apparatus 10. User B uses the personal settings button 42 (refer to FIG. 6B) on the displayed screen and then uses a share button 50 (refer to FIG. 6C) among a plurality of items corresponding to personal settings displayed on the screen.

If user B performs the above operation, the CPU 22 displays a user list screen illustrated in FIG. 7A on the display unit 32 and receives selection of a user with whom the sharing user's personal setting information may be shared, that is, selection of a requesting user. It is assumed here that user B selects user A as a requesting user among displayed users. If the sharing user selects a requesting user, the CPU 22 determines that the sharing user has input permission information for the requesting user.

After the requesting user is selected, the CPU 22 displays user B's personal settings illustrated in FIG. 7B on the display unit 32 and receives selection of a piece of user B's personal setting information that may be shared with the requesting user among displayed pieces of user B's personal setting information. In FIG. 7B, user B, who is a sharing user, operates the image processing apparatus 10. It is assumed that user B selects "For Personnel Department" and "For XX Company" among the pieces of user B's personal setting information on the displayed screen and uses a permit copying button 52. In this case, the CPU 22 determines that permission information has been input, and permits user A to share "For Personnel Department" and "For XX Company" among the pieces of user B's personal setting information. It is also assumed that user B has logged out of the image processing apparatus 10 after inputting the personal setting information that may be shared with the requesting user.

In step S22 illustrated in FIG. 5, the CPU 22 determines whether the requesting user has logged in the image processing apparatus 10. If so, the process proceeds to step S23, and if not, step S22 is performed again.

Figure 8C:
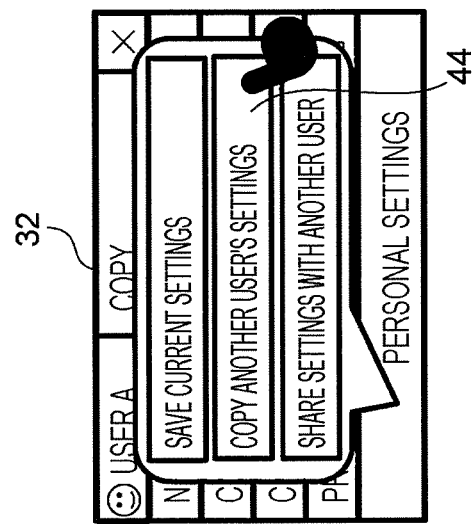
FIGS. 8A to 8C illustrate an example of screens displayed on the display unit during the process illustrated in the flowchart of FIG. 5.
Figure 8B:
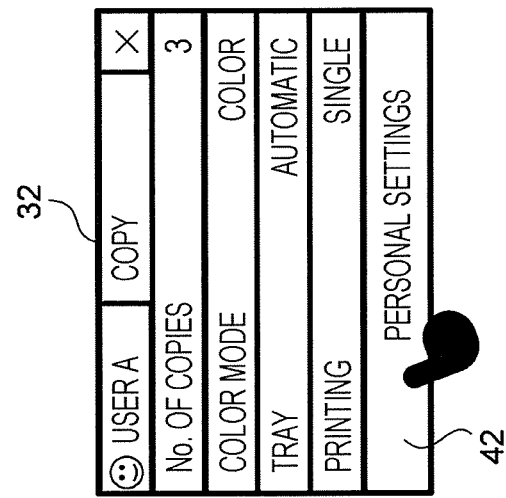
Figure 8A:
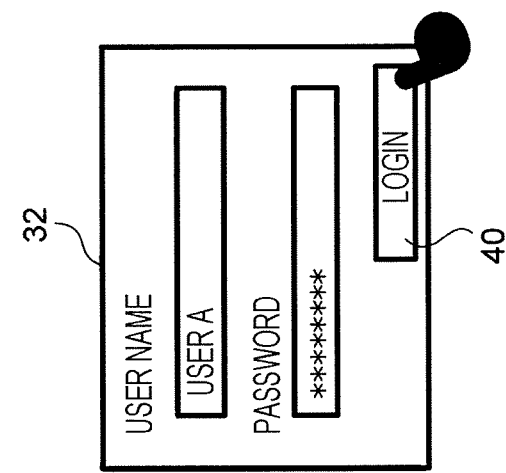

FIG. 8A illustrates an example of a login screen displayed on the display unit 32. In FIG. 8A, the requesting user operates the image processing apparatus 10. In this example, the requesting user is user A. User A inputs a user name and a password on the displayed login screen and uses the login button 40.

If a user name and a password of user A registered in advance and the input user name and password match, the CPU 22 determines that user A has logged in the image processing apparatus 10.

In step S23 illustrated in FIG. 5, the CPU 22 receives selection of a sharing user whose personal setting information is to be shared. The process then proceeds to step S24.

FIGS. 8B and 8C illustrate an example of screens displayed on the display unit 32 after the requesting user logs in. In FIGS. 8B and 8C, user A, who is a requesting user, operates the image processing apparatus 10. User A uses the personal settings button 42 (refer to FIG. 8B) on the displayed screen and then uses the copy button 44 (refer to FIG. 8C) among a plurality of items corresponding to personal settings displayed on the screen.

If user A performs the above operation, the CPU 22 displays a user list screen illustrated in FIG. 9A on the display unit 32 and receives selection of a sharing user whose personal setting information is to be copied. It is assumed here that user A selects user B as a sharing user among displayed users. In other words, in step S23, the CPU 22 obtains, from user A, who is a requesting user, a request to share personal setting information of user B, who is a sharing user.

In step S24 illustrated in FIG. 5, the CPU 22 determines whether there is permission information from the sharing user selected in step S23. If so, the process proceeds to step S25, and if not, the process ends.

If the sharing user selected in step S23 has set, in step S21, personal setting information that may be shared with the requesting user who has logged in the image processing apparatus 10 in step S22, the CPU 22 determines that there is permission information from the sharing user.

The CPU 22 has thus received permission information in step S21 before a request to share the sharing user's personal setting information is obtained from the requesting user in step S23. When the CPU 22 has received permission information in step S21, the CPU 22 has also received, in the same step, a piece of the sharing user's personal setting information that may be shared with the requesting user.

In step S25 illustrated in FIG. 5, the CPU 22 displays the sharing user's personal setting information on the display unit 32. The process then ends.

FIG. 9B illustrates an example of displayed personal settings of the sharing user. As illustrated in FIG. 9B, the display unit 32 displays "For Personnel Department" and "For XX Company", which are pieces of the sharing user's personal setting information determined in step S21 by user B as information that may be shared, are displayed among the plurality of pieces of the sharing user's personal setting information.

In FIG. 9B, user A, who is a requesting user, operates the image processing apparatus 10. It is assumed that user A selects both "For Personnel Department" and "For XX Company" on the displayed screen and uses the copy button 48. In this case, the CPU 22 copies "For Personnel Department" and "For XX Company", which are the selected pieces of user B's personal setting information, to a personal setting page of user A. When the personal setting page of user A is displayed after the copying, therefore, the copied pieces of user B's personal setting information, "For Personnel Department" and "For XX Company", are displayed, and user A can select the pieces of user B's personal setting information as his/her own personal settings.

Modifications

In the above exemplary embodiments, only one user is selected as a requesting user, who is a certain user. Two or more users, or a group including two or more users, however, may be selected as requesting users, instead. In this case, the two or more users or the group including two or more users can use a sharing user's personal setting information.

In the above exemplary embodiments, an expiration date until which sharing of a sharing user's personal setting information is permitted is not provided for a requesting user, and the requesting user can permanently share the sharing user's personal setting information once the sharing of the sharing user's personal setting information is permitted. An expiration period until which sharing of personal setting information is permitted, however, may be provided, instead. For example, the CPU 22 receives setting of an expiration date until which sharing of personal setting information is permitted and, if the expiration date has not come when a request to share personal setting information is obtained from a requesting user, permits the sharing of the personal setting information. In this case, sharing of personal setting information is temporarily permitted.

In the above exemplary embodiments, password authentication is performed when a sharing user is authenticated on the basis of authentication information. At least two of password authentication, pattern authentication, and biometric authentication may be performed, instead, when a sharing user is authenticated on the basis of authentication information. In this case, security of personal setting information improves compared to only one of password authentication, pattern authentication, and biometric authentication is performed.

In the above exemplary embodiments, file names such as "For Personnel Department" and "For XX Company" are displayed on the display unit 32 as personal settings of a sharing user. Image processing settings included in the personal settings, however, may be displayed as well. If "For Personnel Department" is selected as personal setting information, "Color Printing", "Trey 1", "Double-Sided Printing", and the like may be displayed on the display unit 32 as image processing settings included in the personal setting information.

In the above exemplary embodiments, users whose personal setting information is registered in the image processing apparatus 10 are displayed on the user list screen. Only some of the users whose personal setting information is registered in the image processing apparatus 10, such as users whose personal setting information may be shared, however, may be displayed on the user list screen, instead.

In the above exemplary embodiments, a process in which personal setting information is shared for copying as a type of image processing has been described. Types of image processing for which personal setting information is shared, however, are not limited to copying, and personal setting information may be shared for printing, facsimile, or the like, instead.

In the first exemplary embodiment, all pieces of a sharing user's personal setting information are displayed on the display unit 32, and a requesting user selects a desired one of the pieces of the sharing user's personal setting information. Pieces of a sharing user's personal setting information to be displayed on the display unit 32, however, may be selected before the sharing user's personal setting information is displayed on the display unit 32, instead. In this case, some pieces of the sharing user's personal setting information are displayed to the requesting user, whereas other pieces of the sharing user's personal setting information are hidden from the requesting user.

In the first exemplary embodiment, transfer of business is assumed, and user A, who is a requesting user, and user B, who is a sharing user, are supposed to be constantly in front of the image processing apparatus 10. A notification, however, may be transmitted to a terminal apparatus carried by a sharing user when the CPU 22 has received selection of the sharing user from a requesting user, instead. In this case, the sharing user need not be constantly with the requesting user and may be called to the image processing apparatus 10 when inputting of authentication information or the like needs to be performed.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to obtain, from a certain user identified from input authentication information for authenticating the certain user, a request to share personal setting information regarding a personal setting of another user,
receive permission information from the other user indicating permission of the other user to share the personal setting information regarding the personal setting of the other user with the certain user in response to obtaining the request,
receive the persona setting information in response to receiving the permission information, and
permit the certain user to share the personal setting information of the other user in accordance with the permission information indicating the other user's permission.

2. The information processing apparatus according to claim 1,
wherein the certain user is two or more users or a group including two or more users.

3. The information processing apparatus according to claim 2,
wherein the processor is configured to receive authentication information for authenticating the other user as the permission information.

4. The information processing apparatus according to claim 1,
wherein the processor is configured to, if the personal setting information includes a plurality of pieces of personal setting information as the personal setting of the other user, permit the certain user to share one of the plurality of pieces of personal setting information.

5. The information processing apparatus according to claim 4,
wherein the processor is configured to
receive setting of an expiration date until which the sharing of the personal setting information is permitted, and
permit, if the expiration date has not come when the request to share the personal setting information is received from the certain user, the certain user to share the personal setting information.

6. The information processing apparatus according to claim 1,
wherein the processor is configured to
receive setting of an expiration date until which the sharing of the personal setting information is permitted, and
permit, if the expiration date has not come when the request to share the personal setting information is received from the certain user, the certain user to share the personal setting information.

7. The information processing apparatus according to claim 1,
wherein the processor is configured to receive authentication information for authenticating the other user as the permission information.

8. The information processing apparatus according to claim 7,
wherein at least two of password authentication, pattern authentication, and biometric authentication are performed when the other user is authenticated on a basis of the authentication information.

9. A non-transitory computer readable medium storing a program causing a computer to execute a process for processing information, the process comprising:
obtaining, from a certain user identified from input authentication information for authenticating the certain user, a request to share personal setting information regarding a personal setting of another user;
receiving permission information from the other user indicating permission of the other user to share the personal setting information regarding the personal setting of the other user with the certain user in response to obtaining the request;
receiving the personal setting information in response to receiving the permission information; and
permitting the certain user to share the personal setting information of the other user in accordance with the permission information indicating the other user's permission.

10. An information processing apparatus comprising:
processing means for obtaining, from a certain user identified from input authentication information for authenticating the certain user, a request to share personal setting information regarding a personal setting of another user, receiving permission information from the other user indicating permission of the other user to share the personal setting information regarding the personal setting of the other user with the certain user in response to obtaining the request, receiving the persona setting information in response to receiving the permission information, and permitting the certain user to share the personal setting information of the other user in accordance with the permission information indicating the other user's permission.

11. The information processing apparatus according to claim 1,
wherein the processor is configured to receive a command from the other user to share to the certain user the personal setting information regarding the personal setting of the other user.

12. The information processing apparatus according to claim 11,
wherein the processor is configured to, in response to receiving the command, control displaying a list of the certain user and receiving selection of the certain user with whom the personal setting information regarding the personal setting of the other user is shared.

* * * * *